J. F. O'CONNOR.
FRICTION SHOCK ABSORBING MECHANISM.
APPLICATION FILED SEPT. 25, 1919.
1,372,717. Patented Mar. 29, 1921.
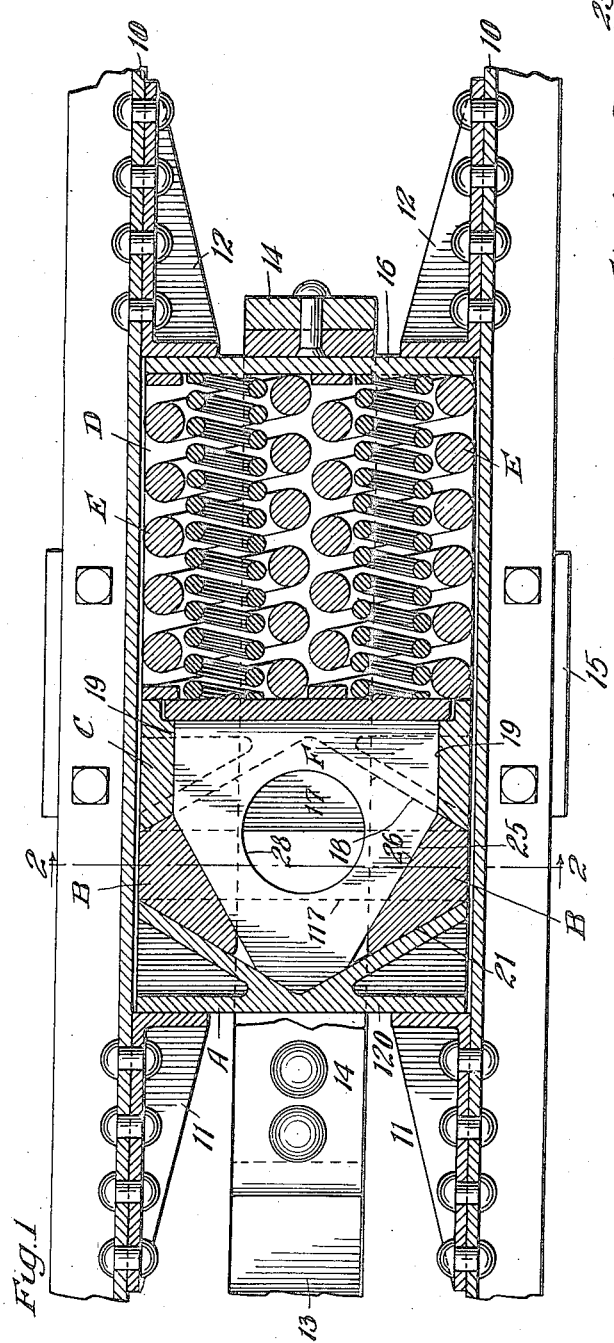
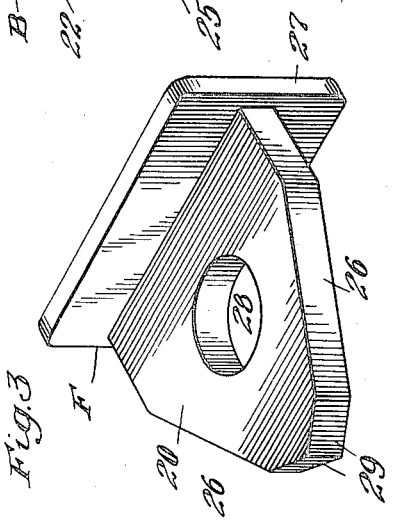
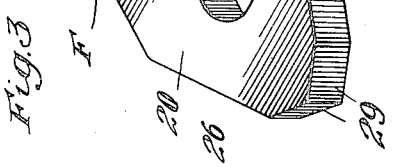
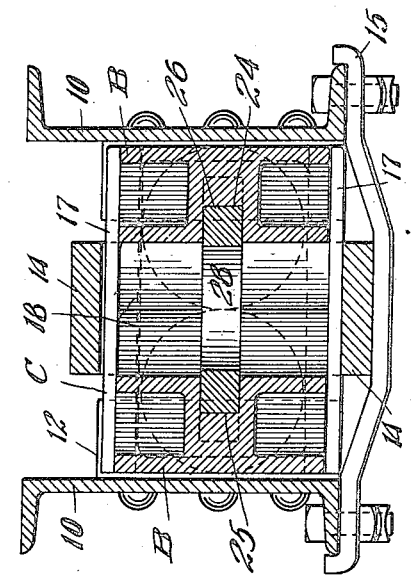
Witnesses
Wm. Geiger
Inventor
John F. O'Connor
By Geo. I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,372,717.      Specification of Letters Patent.    Patented Mar. 29, 1921.

Application filed September 25, 1919. Serial No. 326,124.

*To all whom it may concern:*

Be it known that I, JOHN F. O'CONNOR, a citizen of United States, residing at Chicago, in the county of Cook, and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

The object of the invention is to provide a friction shock absorbing mechanism particularly adapted for use in railway draft riggings and wherein is obtained a high combined friction and spring capacity coupled with certain release, the friction parts being principally in the form of castings.

In the drawing forming a part of this specification, Figure 1 is a horizontal, longitudinal sectional view of a portion of a railway draft rigging showing my improvements in connection therewith. Fig. 2 is a vertical transverse sectional view taken on the line 2—2 of Fig. 1. And Figs. 3 and 4 are detail perspectives of two of the friction elements employed in the construction.

Referring to said drawing, 10—10 denotes channel-shaped center or draft sills of a railway car, to the inner faces of which are applied front stop lugs 11—11 and rear stop lugs 12—12. A portion of the draw bar is indicated at 13, the same being operatively connected to the shock absorbing mechanism proper by a yoke 14 of well known form. The parts are supported in operative position by any suitable means such as the detachable saddle plate 15.

The shock absorbing mechanism proper, as shown, comprises the following elements, broadly; a front combined follower and wedge A, a pair of friction shoes B—B, a wedge friction shell C, a spring cage D, main springs E—E and a wedge spring follower F.

The shell C and spring cage D are preferably formed integral and are so designed as to fit between the ordinary spaced sills and yoke, that is, the general outline is rectangular and the sides of the spring cage D are open so as to permit the insertion of the coiled springs E—E through the sides in a well-known manner. The rear end 16 of the cage D acts as the rear follower and coöperates with the rear stop lugs 12.

The friction shell C is of rectangular exterior outline and has upper and lower horizontal walls 17—17 and rearwardly and inwardly, opposed, inclined friction surfaces 18—18 on each side.

The wedge faces 18—18 are intersected at their central points by longitudinally extending slots or recesses 19—19 of a sufficient width to accommodate the horizontal forward extension 20 of the spring follower F and permit the latter to have longitudinal movement with respect to the friction shell.

The combined wedge follower A has an outer plain face 120 adapting the member A to act as the front follower and receive the load from the drawbar. On its interior said member A is provided with a pair of friction wedge surfaces 21—21 which start from the center of the follower and diverge outwardly and rearwardly on the inner side thereof. Said surfaces 21 are opposed to the friction surfaces 18 as clearly appears from Fig. 1.

The friction shoes B are of like character and each is substantially a trapezoid in horizontal section. The end faces thereof, as indicated at 22 and 23, are inclined or beveled so as to form friction surfaces coöperable with the wedge friction surfaces 21 and 18 respectively. Each of the friction shoes B is also slotted on its inner face as indicated at 24 to accommodate portions of the extension 20 on the spring follower F. The inner edges defining said slots 24 as indicated at 25 constitute friction wedge surfaces coöperable with opposed corresponding friction surfaces 26—26 on the edges of said extension 20. The said extension 20, as clearly appears from Fig. 3, is formed integral with the substantially rectangular follower proper 27 which bears against the forward ends of the springs E—E. To reduce weight, said extension 20 may be cut away as indicated at 28 and the forward end of said extension 20 may be beveled or tapered as indicated at 29 to seat snugly against the friction surfaces 21 of the follower A.

It will be noted that the spring follower F is supported and guided in proper position by the slots 18 of the shell C. The extension 20 on said spring follower F in turn supports and maintains in proper position, the friction shoes B, said shoes B being additionally supported and guided by the upper and lower walls 117—117 of the front follower A.

In operation, upon inward movement of the front follower A, it is evident that the friction shoes B will be forced laterally inwardly toward the center line of the mechanism and in addition will have a certain bodily lineal travel lengthwise of the car. As this movement occurs, friction is generated between the surfaces 23 and 18 and 21 and 22. As the inward lateral movement of the shoes B takes place, the spring follower F is squeezed or forced rearwardly against the yielding resistance of the springs E, friction being thus generated between the surfaces 25 and 26. It will be noted that the included angle between the friction surfaces 21—21, which is the same as that between the surfaces 18—18, is very blunt, approximating 120° whereas the included angle between the friction surfaces 25—25 is much sharper, the same approximating 60°. By this arrangement, I obtain a very high frictional capacity while at the same time the release is insured because of the changes of direction of forces taking place through the two sets of coöperating friction surfaces above mentioned. The structure is also such that the majority of the parts may be made as castings of malleable iron with the exception of the shoes B which are preferably made of tempered steel.

Although I have herein shown and described what I now consider the preferred method of carrying out my invention, the same is merely illustrative and I contemplate such changes and modifications as come within the scope of the claims appended hereto.

I claim:

1. In a friction shock absorbing mechanism, the combination with a spring cage provided at one end with a set of rearwardly inwardly converging friction surfaces, of a spring resistance within said cage, a follower opposite said end of the cage and having rearwardly diverging friction surfaces, friction shoes interposed between said sets of friction surfaces, and a spring follower within the cage, said spring follower having means rigid therewith extending outwardly between said shoes and adapted to be forced inward against the spring resistance upon relative movement between said first named follower and the cage.

2. In a friction shock absorbing mechanism in combination; a pair of relatively longitudinally movable friction members having opposed wedging surfaces, a pair of friction shoes having end faces coöperable with said wedging surfaces and movable relatively laterally, a friction element interposed between and frictionally coöperating with said friction shoes and extending longitudinally to a point beyond one of said friction members, said shoes being slotted on their inner opposed faces to receive said element therein, and spring means against which said extended friction element acts.

3. In a friction shock absorbing mechanism, the combination with a spring cage having at its outer end inwardly and rearwardly inclined friction surfaces, of a follower provided on its inner side with outwardly and rearwardly inclined opposed friction surfaces, friction shoes having end faces coöperable with said friction surfaces and laterally movable, spring means within the cage, a spring follower, and a friction plate extending from said spring follower between said friction shoes, the latter and the plate having coöperating wedge surfaces.

4. In a friction shock absorbing mechanism, the combination with a spring cage having at its outer end inwardly and rearwardly inclined friction surfaces, of a follower provided on its inner side with outwardly and rearwardly inclined opposed friction surfaces, friction shoes having end faces coöperable with said friction surfaces and laterally movable, spring means within the cage, a spring follower, and a friction plate extending from said spring follower between said friction shoes, the latter and the plate having coöperating wedge surfaces, said inclined friction surfaces of the cage and the shoes being longitudinally slotted to accommodate said friction plate.

5. In a shock absorbing mechanism, the combination with a combined spring cage and friction shell, the latter having inwardly and rearwardly inclined friction surfaces, of springs within the cage, a spring follower mounted within the cage and having an extension extending out beyond the friction shell, said shell having slots within which said extension slides, said extension having friction wedge surfaces at the sides thereof, a front follower having wedge surfaces on its inner side opposed to the wedge surfaces of the shell and laterally movable friction shoes interposed between said end follower and the shell and coöperable with the wedge surfaces thereof, said shoes having interior wedge surfaces coöperable with those of the spring follower extension.

In witness that I claim the foregoing I have hereunto subscribed my name this 8th day of Sept. 1919.

JOHN F. O'CONNOR.